(12) United States Patent
Nishiwaki et al.

(10) Patent No.: US 7,187,494 B2
(45) Date of Patent: Mar. 6, 2007

(54) LASER MICROSCOPE

(75) Inventors: Daisuke Nishiwaki, Hino (JP); Eiji Nakasyo, Hino (JP)

(73) Assignee: Olympus Corporation, Tokyo (JP)

( * ) Notice: Subject to any disclaimer, the term of this patent is extended or adjusted under 35 U.S.C. 154(b) by 55 days.

(21) Appl. No.: 10/964,722

(22) Filed: Oct. 15, 2004

(65) Prior Publication Data

US 2005/0174631 A1 Aug. 11, 2005

(30) Foreign Application Priority Data

Oct. 15, 2003 (JP) ............................. 2003-355165

(51) Int. Cl.
*G02B 21/06* (2006.01)
*G02B 21/00* (2006.01)

(52) U.S. Cl. ...................... 359/388; 359/368; 359/381; 359/385

(58) Field of Classification Search ........ 359/368–390; 250/458.1–2; 356/237.1–5; 351/200–246
See application file for complete search history.

(56) References Cited

U.S. PATENT DOCUMENTS 6,094,300 A * 7/2000 Kashima et al. ............ 359/385
6,597,499 B2 * 7/2003 Kawano et al. ............. 359/387
6,819,484 B2 * 11/2004 Aono et al. ................. 359/368
6,992,820 B2 * 1/2006 Abe et al. ................... 359/388

FOREIGN PATENT DOCUMENTS

JP 2001-214373 1/2003
JP 2004-85811 * 3/2004 ................ 359/385

OTHER PUBLICATIONS

English translation of the Japanese reference No. 2003-29153.*

* cited by examiner

*Primary Examiner*—Thong Q Nguyen
(74) *Attorney, Agent, or Firm*—Kenyon & Kenyon LLP

(57) ABSTRACT

A microscope includes a laser light source, a deflecting device, an objective lens, an irradiating system for irradiating a sample with laser light via the objective lens, a detecting device that detects fluorescence from a sample, and a collector lens unit insertable and removable in and out of the path of rays. When the collector lens unit is in the path, laser light converges on the pupil position of the objective lens decentered from the center of the pupil position of the objective lens with chief rays being substantially parallel with the optical axis, and, when the collector lens unit is out of the path, the laser light converges on and, via the deflecting device, scans the sample surface, to achieve a prompt switching between a laser scanning microscopy mode and a total internal reflection fluorescence microscopy mode at low cost.

9 Claims, 7 Drawing Sheets

LASER MICROSCOPE

This application claims priority to Japanese Patent Application No. 2003-355165 filed 15 Oct. 2003, the content of which is incorporated herein by reference in its entirety.

BACKGROUND OF THE INVENTION

1) Field of the Invention

The present invention relates to a laser microscope that allows alternate or simultaneous application of laser scanning microscopy and total internal reflection fluorescence microscopy (TIRFM).

2) Description of Related Art

In biology and medical science, particularly in recent years, laser scanning microscopes are used as means for detecting proteins or genes treated with fluorescent dye in living tissues or cells, for the purpose of analyzing genes or uncovering intracellular structure.

In a typical laser scanning microscope of the conventional type shown in FIG. 6, laser light emitted from a laser light source 1 is reflected at a wavelength selecting element 2, and after being deflected to perform scanning in XY directions via deflecting means 3a, 3b, passes a pupil projecting optical system 4 and an imaging optical system 5, is reflected at a mirror 23a and passes an imaging objective lens 6, to be incident at a spot on a sample 7. The spot beam incident on the sample 7 is made to scan an XY plane (a plane perpendicular to an optical axis) via the deflecting means 3a, 3b, drive of which is controlled by a control unit 40. The sample 7 excited by irradiation with the laser light emits fluorescence. The fluorescence passes the objective lens 6, the mirror 23a, the imaging optical system 5, the pupil projecting optical system 4, and the deflecting means 3a and 3b, and is transmitted through the wavelength selecting element 2, to converge on a position of a confocal aperture 8. Then, fluorescence passing the confocal aperture 8 is detected at a detector 9.

The microscope of FIG. 6 is configured so that the mirror 23a and a wavelength selecting element 23b such as a dichroic mirror can be alternated via a switching member 24 such as a rotary plate or a slider. In a situation where the wavelength selecting element 23b is selected, fluorescence emitted from the sample 7 passes the objective lens 6, the wavelength selecting element 23b, a barrier filter 27 and an imaging lens 28, to be detected at a two-dimensional detector 30 or to be observed by eyes via an observation optical prism 29. In this way, a normal fluorescence observation can be made.

Also, in recent years, use of a total internal reflection fluorescence microscope for function analysis of living cell membrane has become popular.

In a typical total internal reflection fluorescence microscope of the conventional type shown in FIG. 7, laser light emitted from a laser light source 1 passes an illumination optical system 22, is reflected at a wavelength selecting element 23b such as a dichroic mirror, and converges on a pupil position 32 of an objective lens 6 at a position decentered from an optical axis. The collected laser light is incident on a sample 7 via the objective lens 6 at a predetermined incident angle. The laser light incident on the sample at the predetermined incident angle causes total internal reflection at an interface between a cover glass 10 and the sample 7. On this occasion, an evanescent wave penetrates toward the sample side from the interface between the cover glass 10 and the sample 7, to excite the sample 7. The sample 7, as excited, emits fluorescence. The fluorescence emitted from the sample 7 is collected by the objective lens 6 and is transmitted through the wavelength selecting element 23b. Then, only fluorescence is transmitted through a barrier filter 27 and passes an imaging lens 28, to be detected at a two-dimensional detector 30 or to be observed by eyes via an observation optical prism 29.

Also, in the total internal reflection fluorescence microscope, it is possible to adjust decentration of a convergence position of laser light from the optical axis on the pupil position 32 of the objective lens by decentering an emitting position of the laser light source 1 from the optical axis of the illumination optical system or by decentering laser light upon additionally introducing an offset device into the path of rays, so as to change incident angle on the sample 7 and to adjust penetration depth of evanescent waves from the interface between the cover glass 10 and the sample 7.

Intensity of an evanescent wave abruptly attenuates as it goes father from the interface. In the present application, a distance from the interface where the intensity is 1/e of the intensity at the interface is defined as a penetration depth.

A microscope that allows alternate application of such laser scanning microscopy and total internal reflection fluorescence microscopy is proposed, for example, in Japanese Patent Application Preliminary Publication (KOKAI) No. 2003-29153.

The microscope described in KOKAI No. 2003-29153 includes, as shown in FIG. 8, a laser light source 1, a deflecting means 3a, 3b as a laser scanning device for performing scanning with laser light emitted from the laser light source 1, an irradiating optical system 22 (a pupil projecting optical system 4, an imaging optical system 5) that irradiates a sample 7 with the laser light via an objective lens 6 so as to cause the sample 7 to emit fluorescence, and a detecting means 9 that detects the fluorescence from the sample 7. The microscope further includes a collector lens 18 that makes the laser light to converge on a position conjugate with a pupil position 32 of the objective lens 6, an offset means 19 that shifts the laser light in parallel with the laser beam itself by a predetermined distance to make it incident on the objective lens 6 at a position decentered from the center thereof and to make it gradiently incident on the sample 7 as being refracted by the objective lens 6 so that the laser light causes total internal reflection at an interface between a transparent cover member, which is arranged to be in contact with the sample 7 with its surface for contact with the sample 7 being smooth, or a transparent sample holding member 10, which is held to be in contact with the sample 7 with its surface for contact with the sample 7 being smooth, and the sample 7, and an inserting and removing means 20 that can move the collector lens 18 and the offset means 19 individually or collectively between a first position where they are inserted into the path of laser light and a second position where they are and removed from the path of laser light. In addition, a mirror 23a, a dichroic mirror 23b and a barrier filter 27 are arranged on a rotary plate 24, so that one of them is selectively inserted in the path of rays.

It is possible to achieve total internal reflection fluorescence microscopy upon insertion of the inserting and removing means 20 into the path of rays, and to achieve laser scanning microscopy upon removal of the inserting and removing means 20 from the path of rays.

That is, when total internal reflection fluorescence microscopy is employed, the inserting and removing means 20 is inserted in the path of rays and the dichroic mirror 23b and the barrier filter 27 are set in the path of rays via the rotary plate 24.

Laser light emitted from the laser light source 1 passes the collector lens 18, the offset means 19, a wavelength selecting element 2, the deflecting means 3a, 3b, and the pupil projecting optical system 4, is reflected at the dichroic mirror 23b, and, via the imaging optical system 5, converges on the pupil position 32 of the objective lens 6 at a position decentered from the optical axis. The collected laser light is incident on the sample 7 via the objective lens 6 at a predetermined incident angle. The laser light incident on the sample 7 at the predetermined incident angle causes total internal reflection at the interface between the cover glass 10 and the sample 7. On this occasion, an evanescent wave penetrates toward the sample side from the interface between the cover glass 10 and the sample 7, to excite the sample 7. The sample 7, as excited, emits fluorescence. The fluorescence emitted from the sample 7 is collected by the objective lens 6 and is transmitted through the dichroic mirror 23b via the imaging optical system 5. Then, only fluorescence is transmitted through the barrier filter 27 and is detected at a two-dimensional detector 30. Alternatively, only fluorescence is observed by eyes via an observation optical prism 29 and the barrier filter 27.

On the other hand, when laser scanning microscopy is employed, the inserting and removing means 20 is removed from the path of rays and the mirror 23a is set in the path of rays via the rotary plate 24.

Laser light emitted from the laser light source 1 is reflected at the wavelength selecting element 2, and, after being deflected to perform scanning in XY directions via the deflecting means 3a, 3b, drive of which is controlled by a control unit not shown, passes the pupil projecting optical system 4, is reflected at the mirror 23a, and passes the imaging optical system 5 and the objective lens 6, to be incident at a spot on the sample 7. The spot beam incident on the sample 7 is made to scan an XY plane (a plane perpendicular to the optical axis) via the deflecting means 3a, 3b. The sample 7 as excited by irradiation with the laser light emits fluorescence. The fluorescence passes the objective lens 6, the imaging optical system 5, the mirror 23a, the pupil projecting optical system 4, and the scanner 3a, 3b, and is transmitted through the wavelength selecting element 2, to converge on a confocal aperture 8. Then, fluorescence passing the confocal aperture 8 is detected at a detector 9.

SUMMARY OF THE INVENTION

A laser microscope according to the present invention includes a laser light source, a deflecting device that deflects laser light emitted from the laser light source, an objective lens, an irradiating system that irradiates a sample with the laser light via the objective lens, and a detecting device that detects fluorescence emitted from the sample, wherein the laser microscope is provided with a collector lens insertablly and removably arranged in a path of rays, the collector lens causing the laser light to converge on a pupil position of the objective lens with chief rays thereof being substantially parallel with an optical axis, wherein in a situation where the collector lens is out of the path of rays, the laser light converges on a sample surface to scan the sample surface via the deflecting device, and wherein in a situation where the collector lens is in the path of rays, the laser light, which converges on the pupil position of the objective lens via the deflecting device, is decentered from a center of the pupil position of the objective lens.

Also, in the laser microscope according to the present invention, it is preferable that the collector lens is movable in a direction of the optical axis, to shift a convergence position of light in the direction of the optical axis.

Also, in the laser microscope according to the present invention, it is preferable to provide a plurality of systems each including the deflecting device, the irradiating optical system, and the collector lens.

Also, in the laser microscope according to the present invention, it is preferable that the laser microscope has a switching member that causes, by removing the collector lens from the path of rays, the laser light to converge on the sample surface to scan the sample surface via the deflecting device and that causes, by inserting the collector lens in the path of rays, the laser light to converge on the pupil position of the objective lens as being decentered from the center of the pupil position of the objective lens via the deflecting device and that the switching member is composed of a path folding unit insertably and removably arranged in the path of rays in a plane in which optical axes of other optical elements constituting the laser microscope lie.

Also, in the laser microscope according to the present invention, it is preferable that the path folding unit has the collector lens and four reflecting members.

Also, in the laser microscope according to the present invention, it is preferable that the path folding unit has a first subunit that has one of lens components constituting the collector lens and two reflecting members and a second subunit that has the other of the lens components constituting the collector lens and two reflecting members, and that one of the first subunit and the second subunit is fixedly positioned while the remaining subunit is movable in and out of the path of rays.

Also, in the laser microscope according to the present invention, it is preferable that the switching member is composed of a path folding unit arranged on a second plane different from a first plane in which optical axes of other optical elements constituting the laser microscope lie and a prism with two reflecting surfaces that is movable in a direction perpendicular to the first plane, to be in and out of the path of rays on the first plane.

Also, in the laser microscope according to the present invention, it is preferable that the switching member is composed of a path folding unit arranged on a second plane different from a first plane in which optical axes of other optical elements constituting the laser microscope lie and a prism with two reflecting surfaces that is movable in a direction perpendicular to the first plane, to be in and out of the path of rays on the first plane, and that the path folding unit is composed of the collector lens and two reflecting members that are fixedly positioned and a light convergence position adjusting unit that is composed of two reflecting members arranged to be integrally movable along a path of rays of the path folding unit on the second plane so as to achieve a variable light convergence position of the collector lens by changing a path length of the path folding unit.

Also, in the laser microscope according to the present invention, it is preferable that the switching member is composed of a path folding unit arranged on a second plane different from a first plane in which optical axes of other optical elements constituting the laser microscope lie and a prism with two reflecting surfaces that is movable in a direction perpendicular to the first plane, to be in and out of a path of rays on the first plane, and that the path folding unit is composed of the collector lens and four reflecting members that are fixedly positioned and at least one prism formed as a plane-parallel plate insertably and removably arranged in a path of rays of the path folding unit on the second plane so as to achieve a variable light convergence position of the collector lens while maintaining the path length of the path folding unit.

According to the present invention, it is possible to switch to a total internal reflection fluorescence microscopy mode merely by inserting a collector lens in a path of rays in a laser scanning microscope, to build up a total internal reflection fluorescence microscope inexpensively without any additional offset device or driving device.

Also, since decenteration of rays is achieved by the scanning device included in the scanning microscope, prompt operation is possible regarding change in penetration depth of evanescent waves and switching between evanescent microscopy and normal fluorescence microscopy.

Also, it is possible to obtain information in the depth direction of a sample under observation by obtaining intensity ratio of a fluorescence image by total internal reflection microscopy to a fluorescence image by normal fluorescence microscopy. Also, since the convergence position via the collector lens is movable in a direction of the optical axis, the microscope is adaptable to a plurality of objective lenses having different pupil positions.

These and other features and advantages of the present invention will become apparent from the following detailed description of the preferred embodiments when taken in conjunction with the accompanying drawings.

BRIEF DESCRIPTION OF THE DRAWINGS

FIG. 1A shows a state under the laser scanning microscopy mode, where FIG. 1B shows a state under the total internal reflection fluorescence microscopy mode, and where FIG. 1C shows that, in the state of FIG. 1B, the collector lens is movable along the optical axis.

FIG. 2A shows an example in which a plurality of collector lenses form a path folding unit, and FIG. 2B shows an example in which a plurality of lens units form a path folding unit.

DETAILED DESCRIPTION OF THE PREFERRED EMBODIMENTS

Figure 1A:
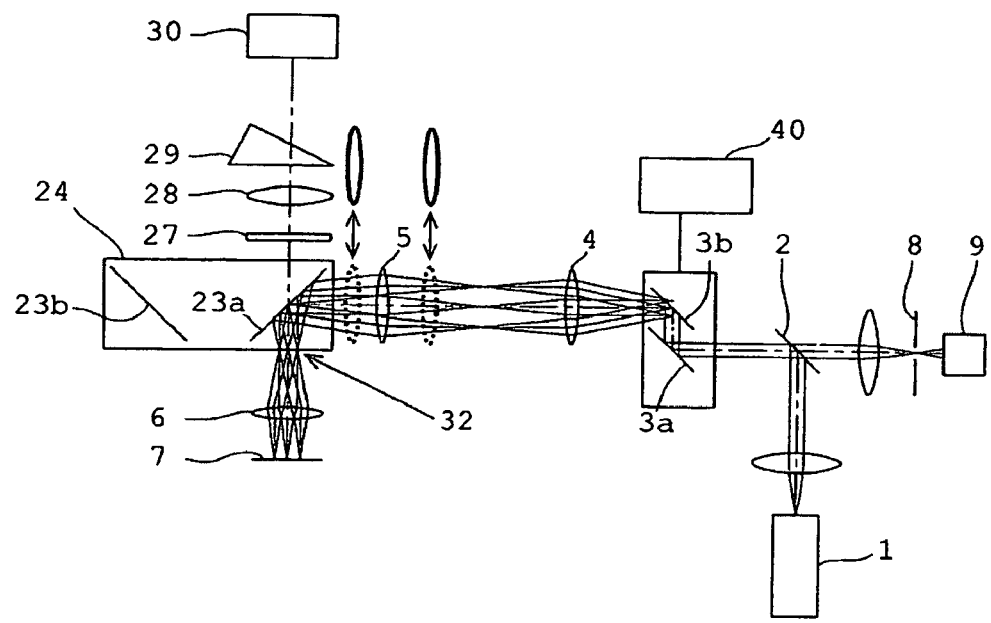
FIGS. 1A–1C are schematic diagrams of a microscope according to the first embodiment of the present invention, where

Preceding the description of the embodiments, the function and effect of the present invention are explained.

According to the laser microscope of the present invention, it is possible to switch to the total internal reflection fluorescence microscopy (TIRFM) mode merely by inserting a collector lens in a path of rays in a laser scanning microscope, to build up a total internal reflection fluorescence microscope inexpensively without any additional offset device or driving device.

Also, if decenteration of a beam of rays is achieved by a scanning device (deflecting device) provided in a scanning microscope as in the laser microscope according to the present invention, prompt operation is possible regarding change in penetration depth of evanescent waves and switching between evanescent microscopy and normal fluorescence microscopy.

Also, according to the laser microscope of the present invention, it is possible to obtain information in the depth direction of a sample under observation by obtaining an intensity ratio of a fluorescence image by total internal reflection microscopy to a fluorescence image by normal fluorescence microscopy.

Also, if a convergence position via a collector lens is movable in a direction of the optical axis as in the laser microscope according to the present invention, the microscope is adaptable to a plurality of objective lenses having different pupil positions.

Also, in the laser microscope according to the present invention, it is preferable that the laser microscope has a switching member that causes, by removing the collector lens from the path of rays, the laser light to converge on the sample surface to scan the sample surface via the deflecting device and that causes, by inserting the collector lens in the path of rays, the laser light to converge on the pupil position of the objective lens as being decentered from the center of the pupil position of the objective lens via the deflecting device and that the switching member is composed of a path folding unit insertably and removably arranged in the path of rays in a plane in which optical axes of other optical elements constituting the laser microscope lie. This configuration allows switching between laser scanning microscopy and total internal reflection fluorescence microscopy even in a microscope having a difficulty in securing a space therein for inserting a collector lens.

In this case, it is preferable to construct the path folding unit to have a collector lens and four reflecting members.

It is preferable that the path folding unit has a first subunit that has one of the lenses constituting the collector lens and two reflecting members and a second subunit that has the other of the lenses constituting the collector lens and two reflecting members, and that one of the first subunit and the second subunit is fixedly positioned while the remaining subunit is movable in and out of the path of rays.

This configuration allows size reduction of a unit that is moved for switching, to save a space required for movement.

Furthermore, it is preferable that the switching member is composed of a path folding unit arranged on a second plane different from a first plane in which optical axes of other optical elements constituting the laser microscope lie and a prism with two reflecting surfaces that is movable in a direction perpendicular to the first plane, to be in and out of a path of rays on the first plane.

This configuration allows moving members used for switching between total internal reflection microscopy and laser scanning microscopy to be structured simple and small to the utmost. In addition, since the prism is arranged to be movable in a direction perpendicular to a direction of path deflection by its two reflecting surfaces, even if the position of the prism as inserted in the path is deviated from the designed position, a position at which deflection occurs is kept constant. Therefore, a position of a beam of light as incident on the collector lens can be kept constant, to facilitate highly accurate illumination on a sample with desired illumination light for observation.

In this case, it is preferable that the path folding unit is composed of the collector lens and two reflecting members that are fixedly positioned and a convergence position adjusting unit that is composed of two reflecting members arranged to be integrally movable along a path of rays of the path folding unit on the second plane so as to achieve a variable light convergence position of the collector lens by changing a path length of the path folding unit.

Even if the objective lens is replaced by another one, this configuration makes it possible to adjust the convergence position of the collector lens in compliance with a focal length of the objective lens.

Alternatively, it is preferable that the path folding unit is composed of the collector lens and four reflecting members that are fixedly positioned and at least one prism formed as a plane-parallel plate insertably and removably arranged in a path of rays of the path folding unit on the second plane so as to achieve a variable light convergence position of the collector lens while maintaining the path length of the path folding unit.

In this configuration, the convergence position of the collector lens is extended when a prism is inserted in the path of rays of the path folding unit. Therefore, in a case where the objective lens is replaced by another one, it is possible to adjust the convergence position of the collector lens by inserting a prism with a different thickness into the path of rays of the path folding unit. In addition, since the convergence position of the collector lens is adjusted using a thickness of the prism inserted in the path of rays, changing the path length of the entire path folding unit is dispensable and a space required for movement can be saved.

The embodiments of the present invention are described below in reference to the drawings.

First Embodiment

Figure 1B:
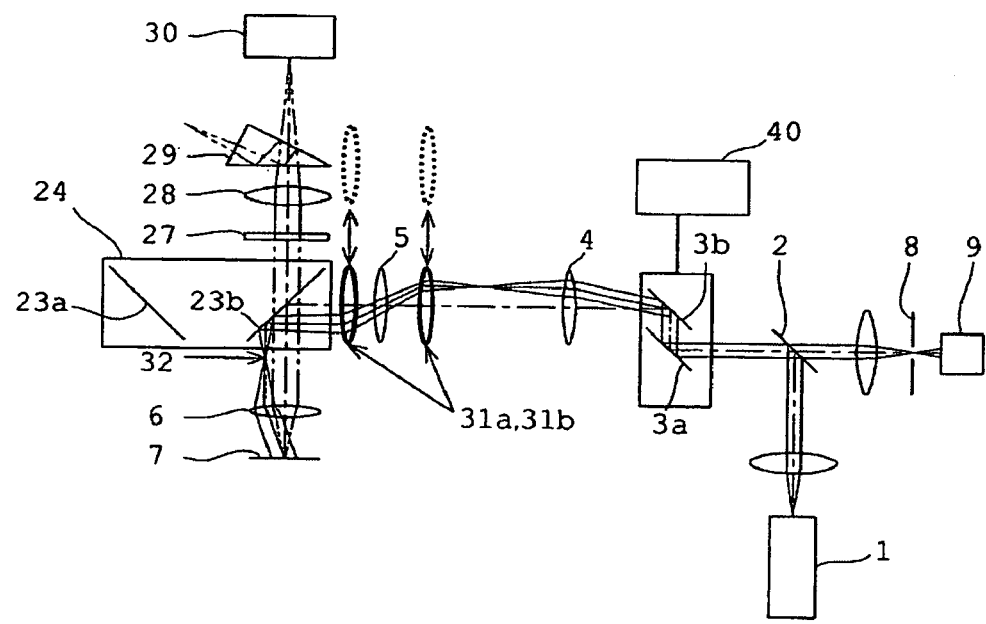
Figure 6:
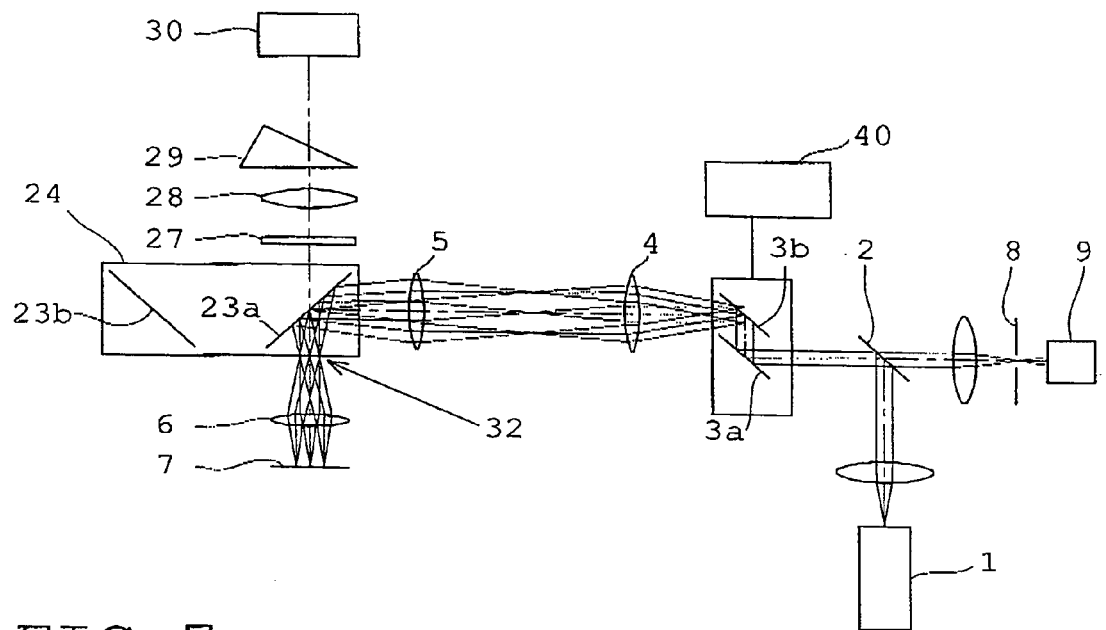
FIG. 6 is a schematic configuration diagram that shows one configuration example of a typical laser scanning microscope of the conventional type.
Figure 7:
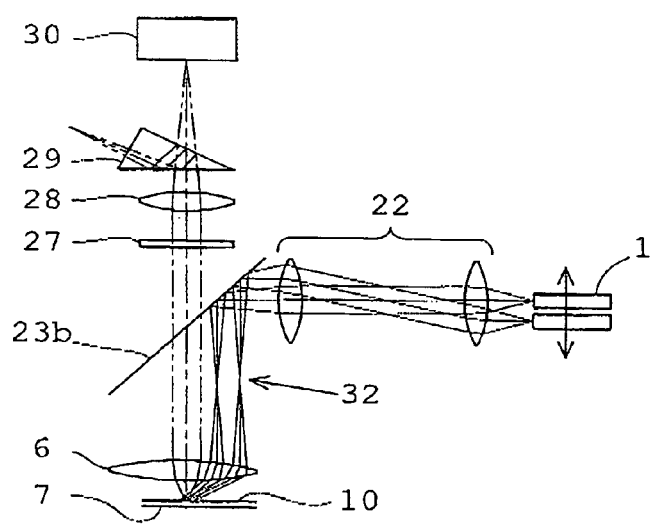
FIG. 7 is a schematic configuration diagram that shows one configuration example of a typical total internal reflection fluorescence microscope of the conventional type.
Figure 8:
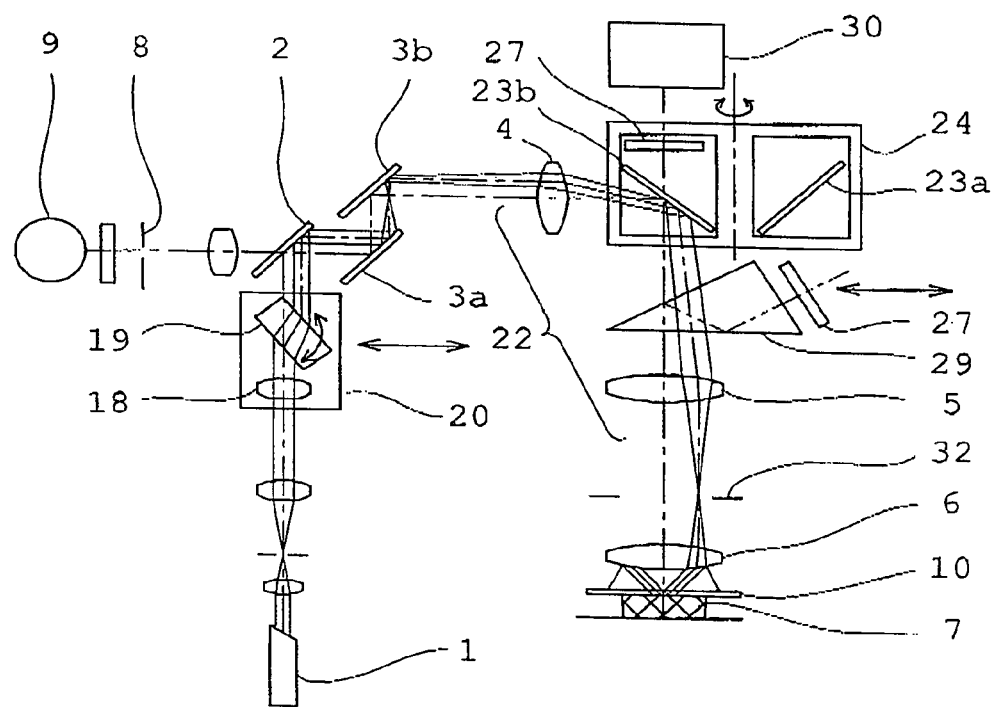
FIG. 8 is a schematic configuration diagram that shows one configuration example of a conventional microscope that is switchable between laser scanning microscopy mode and a total internal reflection fluorescence microscopy mode.

As shown in FIGS. 1A–1B, a microscope according to the first embodiment of the present invention is provided with, in addition to the configuration of the laser scanning microscope shown in FIG. 6, lens units 31a and 31b, as a collector lens, insertable and removable in a path of rays (in reference to FIG. 6, at two positions, between the pupil projecting optical system 4 and the imaging optical system 5, and between the imaging optical system 5 and the objective lens 6).

The lens units 31a and 31b are designed, as inserted in the path of rays, to collect laser light so that the laser light converges on a pupil position 32 of an objective lens 6 in such a manner that chief rays are substantially parallel with an optical axis. When the lens units 31a and 31b are inserted in the path of rays, a pupil position of an irradiating system (a pupil projecting optical system 4 and an imaging optical system 5) coincides with a position of a deflecting device 3a, 3b.

Since the deflecting device 3a, 3b is positioned at a pupil position of the irradiating system, it is possible to change an amount of decentration of the rays converging on the pupil position 32 of the objective lens 6 from the optical axis by deflecting the laser light in XY directions via a control unit 40 as in the case of a laser scanning microscope.

Since the pupil position 32 of the objective lens 6 differs by individual objective lenses, in order to adapt the microscope to a plurality of objective lenses, it is necessary to change the convergence position in a direction of the optical axis in accordance with an objective lens in use so that chief rays of the laser light are substantially parallel with the optical axis.

Figure 1C:
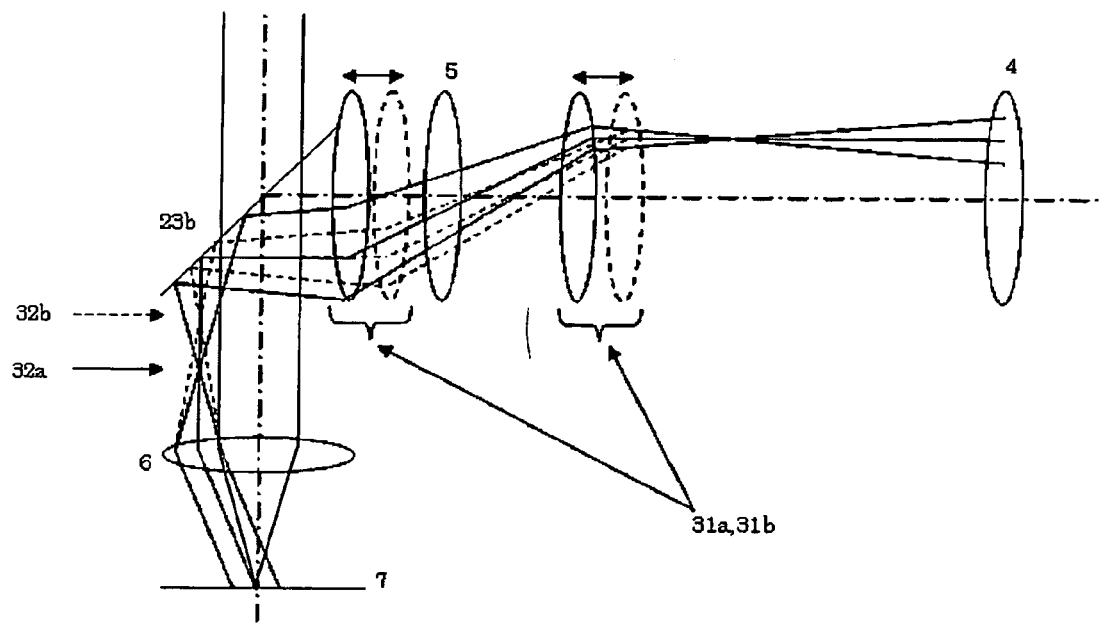

As shown in FIG. 1C, in the microscope of this embodiment, the lens units 31a and 31b are movable in the direction of the optical axis, to thereby make it possible to shift the convergence position of the laser light in the direction of the optical axis as indicated by 32a and 32b.

In the microscope of this embodiment thus configured, in a case where it is used as a laser scanning microscope, the lens units 31a and 31b should be removed from the path of rays and a mirror 23a should be placed in the path of rays, then the microscope functions similar to the conventional laser scanning microscope shown in FIG. 6.

In a case where the microscope is used as a total internal reflection fluorescence microscope, the lens units 31a and 31b should be inserted in the path of rays and a wavelength selecting element 23b is set in place in the path of rays.

In the situation where the lens units 31a and 31b are inserted, laser light emitted from the laser light source 1 is reflected by a wavelength selecting element 2, and, after being deflected by the deflecting device 3a, 3b, drive of which is controlled by the control device 40, in XY directions, converges on the pupil position 32 of the objective lens 6 at a position decentered from the optical axis via the pupil projecting optical system 4, the imaging optical system 5, the wavelength selecting element 23b, and the lens units 31a and 31b.

The collected laser light is incident on a sample 7 via the objective lens 6 at a large incident angle. The laser light incident on the sample 7 causes total internal reflection at an interface between a cover glass 10 and the sample 7. On this occasion, evanescent waves penetrate toward the sample side from the interface between the cover glass 10 and the sample 7, to excite the sample 7. The sample 7, as excited, emits fluorescence. The fluorescence emitted from the sample 7 is collected by the objective lens 6 and is transmitted through the wavelength selecting element 23b. Then, only fluorescence is transmitted through a barrier filter 27 and passes an imaging lens 28, to be detected at a two-dimensional detector 30 or, alternatively, to be observed by eyes via an observation optical prism 29.

In this case, by changing an angle of the deflecting device 3a, 3b, it is possible to shift the convergence position of the laser light on the pupil position 32 of the objective lens 6 in a direction perpendicular to the optical axis. Therefore, in the situation where the lens units 31a and 31b are inserted, if deflection is made with the deflecting device 3a, 3b with a tilt angle being set to cause the convergence position of the laser light on the pupil position 32 of the objective lens 6 to be peripheral in reference to the optical axis, the microscope can be used as a total internal reflection fluorescence microscope having a variable incident angle of laser light on the sample 7. Also, if deflection is made via the deflecting device 3a, 3b with its tilt angle being set to cause the convergence position of the laser light on the pupil position 32 of the objective lens 6 to be close to the optical axis, total internal reflection does not occur between the sample 7 and the cover glass 10, and thus normal fluorescence observation can be performed in a range of the vicinity of the optical axis on the sample. In this case, simultaneous use of a measure to eliminate speckle noise is desirable.

Second Embodiment

In the first embodiment, the configuration is made so that the collector lens (the lens units 31a and 31b) is inserted at two positions between the pupil projecting optical system 4 and the imaging optical system 5, and between the imaging optical system 5 and the objective lens 6. However, in some microscopes, it is difficult to secure a space for inserting a collector lens.

Figure 2A:
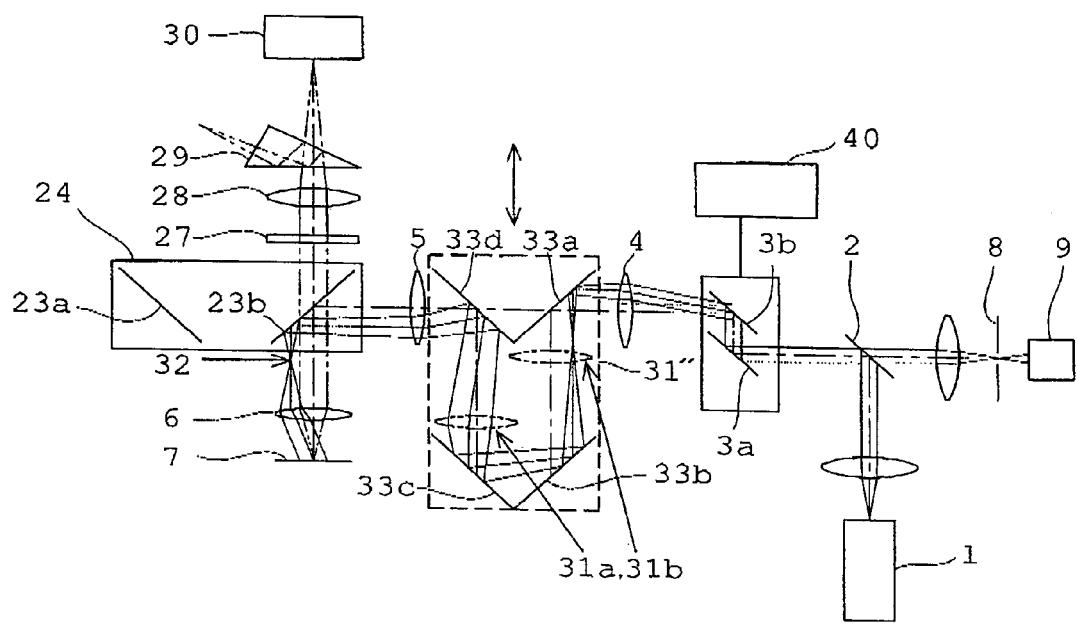
FIGS. 2A–2B are schematic configuration diagrams of a laser microscope according to the second embodiment of the present invention used as a total internal reflection fluorescence microscope, where
Figure 2B:
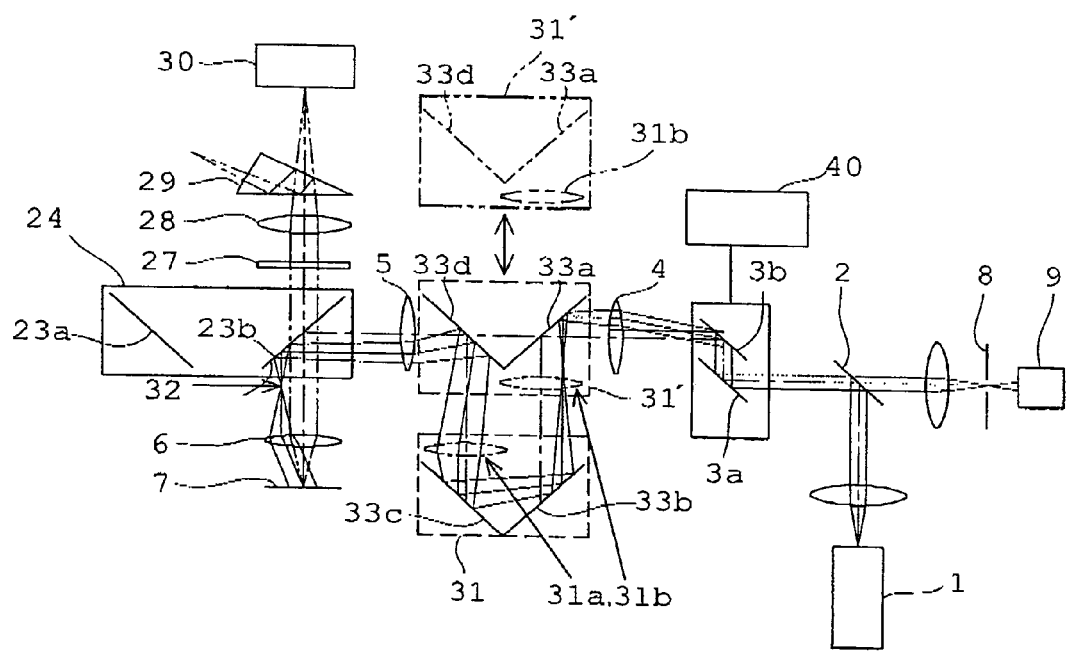

Therefore, as shown in FIGS. 2A–2B, according to the second embodiment of the present invention, a space for inserting a collector lens therein is secured by folding a path of rays, to constitute a collector lens unit upon lenses 31a and 31b being arranged in this space. Here, all of optical members constituting path folding lens unit(s) (a lens unit 31" or lens units 31 and 31') are arranged on the same plane (a plane parallel with the drawing sheet of FIG. 2) as optical axes of other optical elements constituting the laser microscope lie therein (that is, two-dimensional arrangement).

The collector lens may be composed of one lens unit 31" insertably and removably arranged in the path of rays as shown in FIG. 2A or composed of a plurality of lens units 31 and 31', only one of which, or the lens unit 31' is arranged to be movable in and out of the path of rays as shown in FIG. 2B.

In the example of FIG. 2A, the lens unit 31" is composed of a mirror 33a, the collector lens 31b, a mirror 33b, a mirror 33c, the collector lens 31a and a mirror 33d, and is insertable and removable in and out of the path of rays. In a situation where the lens unit 31" is inserted in the path of rays and a wavelength selecting element 23b is set in place in the path of rays, the microscope can be used as a total internal reflection fluorescence microscope as in the situation shown in FIG. 1B. On the other hand, in a situation where the lens unit 31" is removed from the path of rays and a mirror 23a is set in place in the path of rays, the microscope can be used as a laser scanning microscope as in the situation shown in FIG. 1A.

In the example of FIG. 2B, the lens unit 31' is composed of a mirror 33a, the collector lens 31b and a mirror 33d, and is movable in and out of the path of rays. The lens unit 31 is composed of a mirror 33b, a mirror 33c and the collector lens 31a, and is fixedly positioned. Upon the lens unit 31' being inserted in the path of rays, the mirror 33a, the collector lens 31b, the mirror 33b, the collector lens 31a and the mirror 33d form a folded path of rays. In a situation where the lens unit 31' is inserted in the path of rays and a wavelength selecting element 23b is set in place in the path of rays, the microscope can be used as a total internal reflection fluorescence microscope as in the situation shown in FIG. 1B. On the other hand, in a situation where the lens unit 31' is removed from the path of rays and a mirror 23a is set in place in the path of rays, the microscope can be used as a laser scanning microscope as in the situation shown in FIG. 1A.

Third Embodiment

Figure 3:
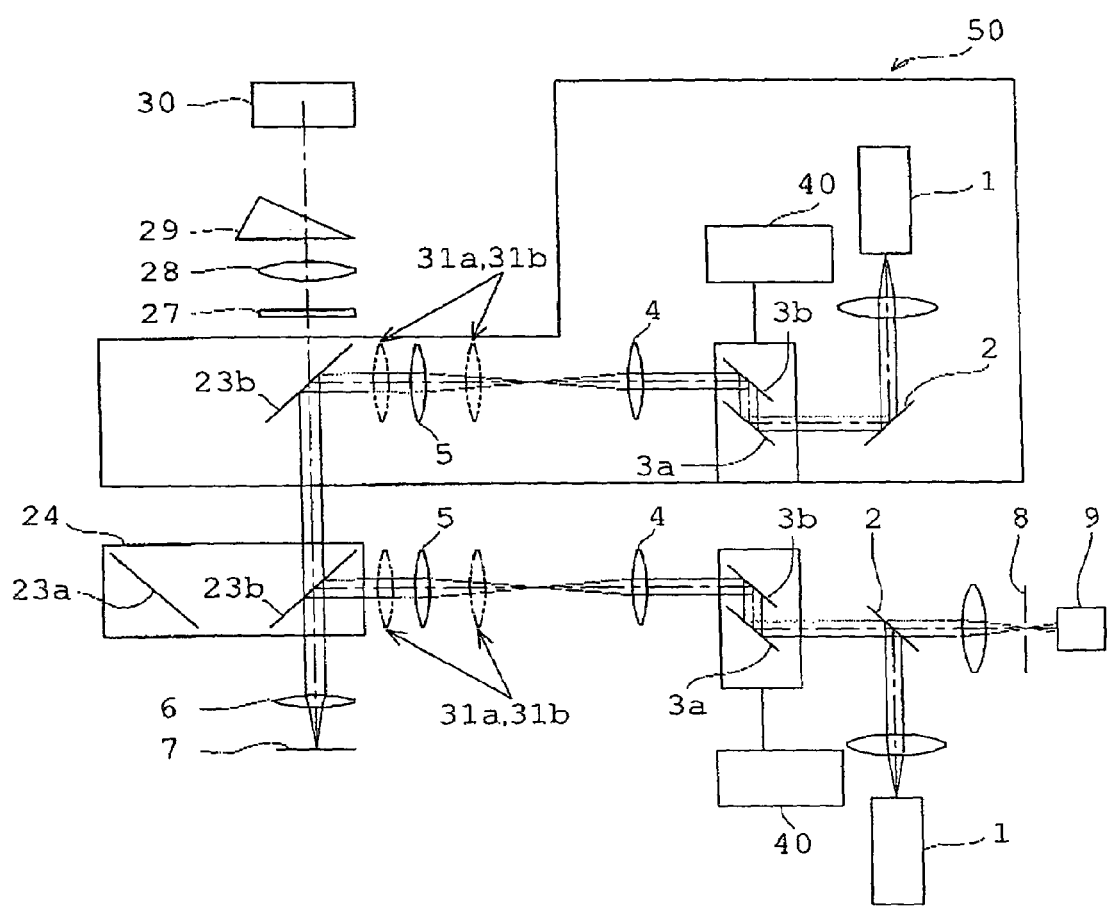
FIG. 3 is a schematic configuration diagram of a laser microscope according to the third embodiment of the present invention.

As shown in FIG. 3, a laser microscope according to the third embodiment of the present invention has, in addition to the configuration of the first embodiment, a subscanner 50 configured of optical members from a light source 1 through a wavelength selecting element 23b. In the example of FIG. 3, a system configured of optical members including a light source 1 through a wavelength selecting element 23b (mirror 23a) other than those in the subscanner 50, a confocal aperture 8 and a detector 9 is referred to as a "main scanner" for convenience of explanation.

This configuration allows various microscopy modes to be simultaneously applied upon the individual scanners being set to construct either one of a laser scanning microscope and a total internal reflection fluorescence microscope.

For example, while achieving total internal reflection fluorescence microscopy upon inserting lenses 31a and 31b in a path of rays in the main scanner, it is possible to observe an object under inspection with photostimulation being given to a minute region thereon upon removing lenses 31a and 31b from a path of rays and emitting laser light from the laser light source 1 intermittently in the subscanner 50. In this case, if the light source of the subscanner 50 is constructed of a pulsed laser light source having ultrashort pulses as long as 100 femtoseconds of near-infrared wavelengths emitted at a repetition frequency as high as 100 MHz, multiphoton photostimulation and total internal reflection fluorescence microscopy can be simultaneously achieved.

Also, for example, while achieving total internal reflection fluorescence microscopy upon inserting the lenses 31a and 31b in the path of rays in the subscanner 50, it is possible to achieve laser scanning microscopy upon removing the lenses 31a and 31b from the path of rays in the main scanner. In this case, if the light source of the main scanner is constructed of a pulsed laser light source having ultrashort pulses as long as 100 femtoseconds of near-infrared wavelengths emitted at a repetition frequency as high as 100 MHz, multiphoton laser scanning microscopy and total internal reflection fluorescence microscopy can be simultaneously achieved.

Also, for example, upon inserting the lenses 31a and 31b in the path of rays in each of the main scanner and the subscanner 50 and arranging different wavelengths for the laser light sources 1 of the scanners, it is possible to achieve total internal reflection fluorescence microscopy using two different wavelengths. In this case, since each of the main scanner and the subscanner 50 is provided with a deflecting device 3a, 3b, a penetration depth of an evanescent wave caused by the main scanner and a penetration depth of an evanescent wave caused by the subscanner are independently changeable via the respective deflecting devices 3a, 3b.

Fourth Embodiment

Figure 4:
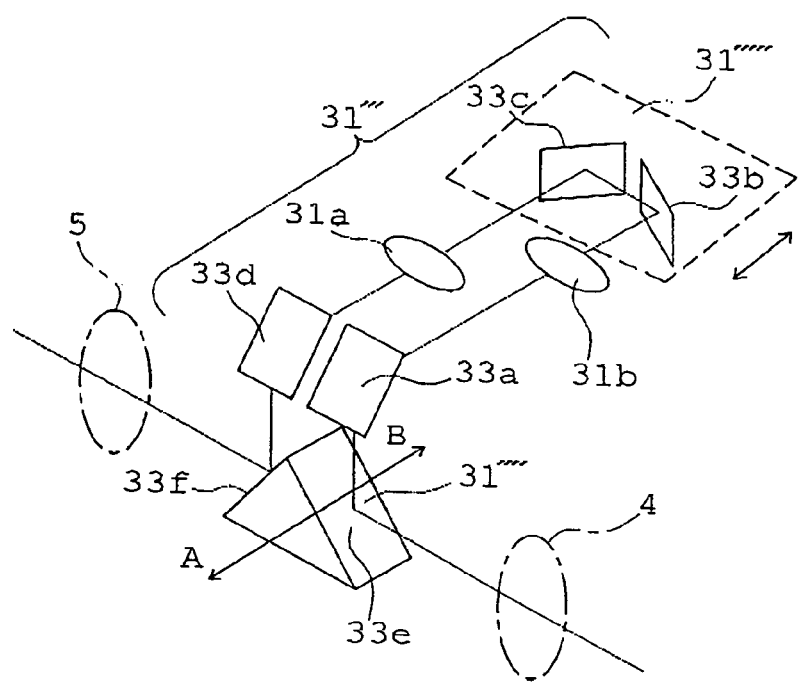
FIG. 4 is a schematic configuration diagram that shows a structure for switching between a laser scanning microscopy mode and a total internal reflection fluorescence microscopy mode in a laser microscope according to the fourth embodiment of the present invention.

FIG. 4 shows a structure for switching between laser scanning microscopy and total internal reflection microscopy in a laser microscope according to the fourth embodiment of the present invention. The remaining configuration of this embodiment is the same as the configuration shown in FIGS. 1 and 2, and is not shown in the drawing.

According to the second embodiment, as shown in FIG. 2, all of the optical members constituting the path folding lens unit(s) (the lens unit 31" or the lens units 31 and 31') are arranged on the same plane (a plane parallel with the drawing sheet of FIG. 2) as the optical axes of other optical elements constituting the laser microscope lie therein (that is, two-dimensional arrangement).

However, in some microscopes, it is difficult to secure a space for arranging all optical members constituting path folding lens unit (s) in one plane.

In addition, in a configuration where insertion and removal of the collector lens is made by movement of the path folding unit along a direction of path deflection by the path folding unit for switching between laser scanning microscopy and total internal reflection fluorescence microscopy as in the second embodiment, even a slight positional deviation of the path folding unit, as inserted, from the designed position would cause a large positional variation of a beam of rays as incident on the collector lens, to result in a large variation of the convergence position. Therefore, a troublesome work is required for accurate alignment of the path folding unit, and thus involves a difficulty in illuminating the sample 7 with desired illumination light for observation highly accurately. Furthermore, in a configuration where a plurality of optical members, which include lenses that constitute a collector lens, are moved, the structure for switching between laser scanning microscopy and total internal reflection microscopy is rendered bulky, to require a large space for its movement. Accordingly, to some microscopes, application of the path folding lens unit as in the second embodiment is unfeasible.

Therefore, according to the fourth embodiment, the configuration is made so that optical members constituting a path folding unit 31''' are arranged in a path of rays three dimensionally, that lenses 31*a* and 31*b*, which constitute a collector lens, are fixedly positioned in the path folding lens unit 31''', and that insertion and removal of the collector lenses 31*a* and 31*b* in the path of rays of the microscope is achieved by moving only a prism 31'''' with two reflecting surfaces 33*e* and 33*f* in a direction (the direction of the arrow AB) perpendicular to the direction of the path deflection by the reflecting surfaces 33*e* and 33*f*.

The reflecting surface 33*e* of the prism 31'''' is configured to reflect incident light from a pupil projecting optical system 4 at right angles on a plane (a plane corresponding to the plane parallel with the drawing sheet of FIG. 2) in which optical axes of other optical elements constituting the laser microscope lie.

The reflecting surface 33*f* of the prism 31'''' is configured to reflect incident light from a mirror 33*d* in the path folding lens unit 31''' at right angles, to introduce it to an imaging optical system 5.

Also, the prism 31'''' is configured to be movable, via an inserting and removing member such as a slider not shown, in a direction (the direction of the arrow AB) perpendicular to the direction of path deflection by the reflecting surfaces 33*e* and 33*f*.

The path folding unit 31''' is composed of a mirror 33*a*, the lens 31*b*, a mirror 33*b*, a mirror 33*c*, the lens 31*a* and the mirror 33*d*, and a path of rays from the mirror 33*a* through the mirror 33*d* is arranged on a plane different from (in this embodiment, perpendicular to) the plane (the plane corresponding to the plane parallel with the drawing sheet of FIG. 2) in which the optical axes of other optical elements constituting the laser microscope lie.

The mirrors 33*b* and 33*c* are configured to fold back incident light from the lens 31*b* along an optical axis parallel with the optical axis of the lens 31*b*, to make it incident on the lens 31*a*. Also, the mirrors 33*b* and 33*c* constitute a convergence position adjusting unit 31''''', which is configured to be movable along a direction (a direction parallel with the direction of the arrow AB) of the optical axes of the lenses 31*b* and 31*a*.

According to the microscope of the fourth embodiment thus configured, upon inserting the prism 31'''' in a path of rays between the pupil projecting optical system 4 and the imaging optical system 5 and placing a wavelength selecting element 23*b*, shown in FIG. 1 but not shown in FIG. 4, in the path of rays, the microscope can be used as a total internal reflection fluorescence microscope as in the situation shown in FIG. 1B. On the other hand, upon removing the prism 31'''' from the path of rays and setting a mirror 23*a*, shown in FIG. 1 but not shown in FIG. 4, in place in the path of rays, the microscope can be used as a laser scanning microscope as in the situation shown in FIG. 1A.

Therefore, according to the microscope of the fourth embodiment, since only the prism 31'''' is moved for switching between total internal reflection microscopy and laser scanning microscopy, the moving member used for switching between these microscopy modes can be structured simple and small to the utmost.

In addition, since the configuration is made so that the prism 31'''' is movable in a direction (the direction of the arrow AB) perpendicular to the direction of path deflection by the reflecting surfaces 33*e* and 33*f*, even if the position of the prism 31'''', as inserted in the path, is deviated from the designed position in the direction of the arrow AB, a position at which deflection occurs is kept constant. Consequently, a position of a beam of light as incident on the lenses 31*a* and 31*b*, which constitute the collector lens, can be kept constant without accurate positional adjustment of the prism 31'''' as inserted, to facilitate highly accurate illumination on the sample 7 with desired illumination light for observation.

Also, according to the microscope of the fourth embodiment, since the convergence position adjusting unit 31''''' is configured to be movable in the direction of the optical axes of the lenses 31*b* and 31*a* (in the direction parallel with the arrow AB), even in a case where an objective lens (the objective lens 6 in FIG. 1) is replaced by another one, the convergence position of the collector lens is adjustable in compliance with a focal length of the objective lens.

Fifth Embodiment

Figure 5:
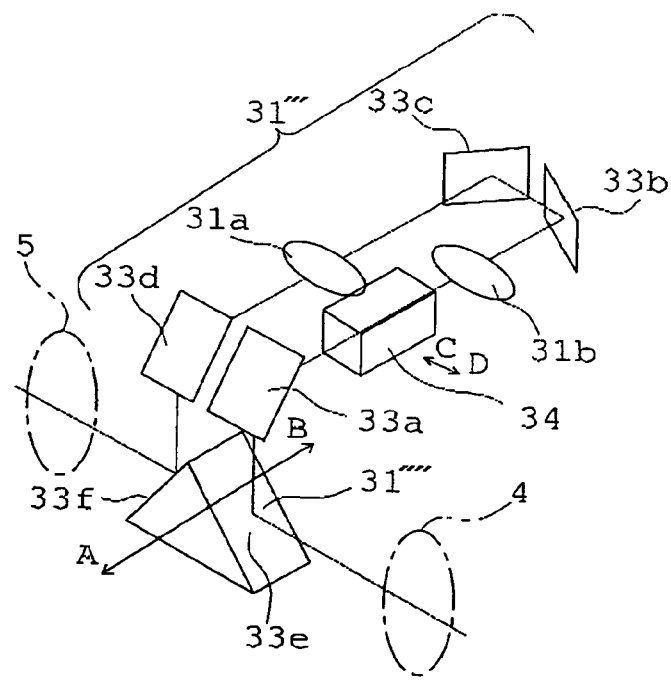
FIG. 5 is a schematic configuration diagram that shows a strucrture for switching between a laser scanning microscopy mode and a total internal reflection fluorescence microscopy mode in a laser microscope according to the fifth embodiment of the present invention.

FIG. 5 shows a structure for switching between laser scanning microscopy and total internal reflection microscopy in a laser microscope according to the fifth embodiment of the present invention. The remaining configuration of this embodiment is the same as the configuration shown in FIGS. 1 and 2, and is not shown in the drawing.

In the microscope of the fifth embodiment, the configuration is made so that mirrors 33*b* and 33*c* are fixedly positioned inside a path folding unit 31''' and that a prism 34 formed as a plane-parallel plate is arranged to be movable, via an inserting and removing member such as a slider not shown, in a direction (the direction of the arrow CD in FIG. 5) perpendicular to an optical axis of the path folding unit 31'''. Although FIG. 5 shows a single prism 34 for convenience sake, a plurality of prisms having different thicknesses may be provided to be insertable and removable in and out of the path of rays via an inserting and removing member such as a slider. Also, although the prism 34 is insertably and removably arranged in a path between a mirror 33*a* and the mirror 33*b*, it may be insertably and removably arranged in a path between the mirror 33*c* and a mirror 33*d*. The remaining configuration is substantially the same as the fourth embodiment.

According to the microscope of the fifth embodiment, in the situation where the prism 34 is inserted in the path of the path folding lens unit 31''', the convergence position of the collector lens is extended. Therefore, when an objective lens (the objective lens 6 in FIG. 1) is replaced by another one, the convergence position of the collector lens can be adjusted by inserting a prism 34 with a different thickness in the path of rays of the path folding lens unit 31''' in compliance with a focal length of the objective lens. Also, since adjustment of the convergence position of the collector lens relies on a thickness of the prism 34 inserted in the path of rays, it is not necessary to change the path length of the entire path folding lens unit. Thus, a space is saved in the direction of the arrow AB in comparison with the microscope of the fourth embodiment shown in FIG. 4.

Also, according to the microscope of the fifth embodiment, since only a prism 31'''' is moved for switching between total internal reflection microscopy and laser scanning microscopy as in the microscope of the fourth embodiment, the structure for switching between these microscopy modes can be made simple and small to the utmost.

In addition, since the configuration is made so that the prism 31'''' is movable in a direction (the direction of the arrow AB) perpendicular to the direction of path deflection by reflecting surfaces 33e and 33f, even if the position of the prism 31'''', as inserted in the path, is deviated from the designed position in the direction of the arrow AB, a position at which deflection occurs is kept constant. Consequently, a position of a beam of light as incident on lenses 31a and 31b, which constitute a collector lens, can be kept constant without accurate positional adjustment of the prism 31'''' as inserted, to facilitate highly accurate illumination of the sample 7 with desired illumination light for observation.

It is noted that insertion and removal of a lens with respect to a path of rays can be accomplished by one of the following two methods:

A) moving the lens into or out of a fixed path of rays;

B) deflecting a path of rays to pass or bypass the lens which is fixedly positioned.

The method B is applied to the fourth and fifth embodiments. For introducing light to a member such as a lens, it is not always necessary to move the lens into the path. Alternatively, the path of rays may be deflected to pass a fixedly positioned lens.

In the fourth and fifth embodiments, when inserted in the path of rays, the prism 31'''' shown in FIG. 4 and FIG. 5 functions to fold and prolong the path of rays between the lens 4 and the lens 5. In the prolonged path of rays, the collector lenses 31a and 31b are preliminarily arranged. As a result, insertion of the prism 31'''' guides the path of rays to the collector lenses 31a and 31b, to achieve insertion of the collector lenses 31a and 31b in the path of rays without movement of the very collector lenses 31a and 31b.

As described in reference to the embodiments above, the present invention provides a microscope that can be switched from laser scanning microscopy mode to total internal reflection fluorescence microscopy mode inexpensively and promptly without any additional offset device or driving device, and that is adaptable to a plurality of objective lenses having different pupil positions.

What is claimed is:

1. A laser microscope comprising:
   a laser light source;
   a deflecting device that deflects laser light emitted from the laser light source;
   an objective lens;
   an irradiating system that irradiates a sample with the laser light via the objective lens; and
   a detecting device that detects fluorescence emitted from the sample,
   wherein the laser microscope is provided with a collector lens insertably and removably arranged in a path of rays between the objective lens and the deflecting device, the collector lens causing the laser light to converge on a pupil position of the objective lens with chief rays thereof being substantially parallel with an optical axis,
   wherein in a situation where the collector lens is removed from the path of rays, the laser light converges on a sample surface, to scan the sample surface via the deflecting device, and
   wherein in a situation where the collector lens is inserted in the path of rays, a pupil position of an optical system composed of the irradiating system and the collector lens coincides with a position of the deflecting device and the laser light converging on the pupil position of the objective lens is decentered from a center of the pupil position of the objective lens by the deflecting device.

2. A laser microscope according to claim 1, wherein the collector lens is movable in a direction of the optical axis, to shift a convergence position of light in the direction of the optical axis.

3. A laser microscope according to claim 1, wherein the laser microscope is provided with a plurality of systems each including the deflecting device, the irradiating system, and the collector lens.

4. A laser microscope according to claim 1,
   wherein the laser microscope has a switching member that causes, by removing the collector lens from the path of rays, the laser light to converge on the sample surface to scan the sample surface via the deflecting device and that causes, by inserting the collector lens in the path of rays, the laser light to converge on the pupil position of the objective lens as being decentered from the center of the pupil position of the objective lens via the deflecting device, and
   wherein the switching member is composed of a path folding unit insertably and removably arranged in the path of rays in a plane in which an optical axis of other optical elements constituting the laser microscope lies.

5. A laser microscope according to claim 1,
   wherein the laser microscope has a switching member that causes, by removing the collector lens from the path of rays, the laser light to converge on the sample surface to scan the sample surface via the deflecting device and that causes, by inserting the collector lens in the path of rays, the laser light to converge on the pupil position of the objective lens as being decentered from the center of the pupil position of the objective lens via the deflecting device,
   wherein the switching member is composed of a path folding unit insertably and removably arranged in the path of rays in a plane in which optical axes of other optical elements constituting the laser microscope lie, and
   wherein the path folding unit has the collector lens an four reflecting members.

6. A laser microscope according to claim 1,
   wherein the laser microscope has a switching member that causes, by removing the collector lens from the path of rays, the laser light to converge on the sample surface to scan the sample surface via the deflecting device and that causes, by inserting the collector lens in the path of rays, the laser light to converge on the pupil position of the objective lens as being decentered from the center of the pupil position of the objective lens via the deflecting device,
   wherein the switching member is composed of a path folding unit insertably and removably arranged in the path of rays in a plane in which optical axes of other optical elements constituting the laser microscope lie, and wherein the path folding unit has a first subunit that has one of lens components constituting the collector lens and two reflecting members and a second subunit that has another of the lens components constituting the collector lens and two reflecting members, one of the first subunit and the second subunit being fixedly positioned while a remaining subunit being movable in and out of the path of rays.

7. A laser microscope according to claim 1, wherein the laser microscope has a switching member that causes, by removing the collector lens from the path of rays, the laser light to converge on the sample surface to scan the sample surface via the deflecting device and that causes, by inserting the collector lens in the path of rays, the laser light to converge on the pupil position of the objective lens as being decentered from the center of the pupil position of the objective lens via the deflecting device, and wherein the switching member is composed of a path folding unit arranged on a second plane different from a first plane in which optical axes of other optical elements constituting the laser microscope lie and a prism with two reflecting surfaces that is movable in a direction perpendicular to the first plane, to be in and out of the path of rays on the first plane.

8. A laser microscope according to claim 1, wherein the laser microscope has a switching member that causes, by removing the collector lens from the path of rays, the laser light to converge on the sample surface to scan the sample surface via the deflecting device and that causes, by inserting the collector lens in the path of rays, the laser light to converge on the pupil position of the objective lens as being decentered from the center of the pupil position of the objective lens via the deflecting device, wherein the switching member is composed of a path folding unit arranged on a second plane different from a first plane in which optical axes of other optical elements constituting the laser microscope lie and a prism with two reflecting surfaces that is movable in a direction perpendicular to the first plane, to be in and out of the path of rays on the first plane, and wherein the path folding unit is composed of the collector lens and two reflecting members that are fixedly positioned and a convergence position adjusting unit that is composed of two reflecting members arranged to be integrally movable along a path of rays of the path folding unit on the second plane so as to achieve a variable light convergence position of the collector lens by changing a path length of the path folding unit.

9. A laser microscope according to claim 1, wherein the laser microscope has a switching member that causes, by removing the collector lens from the path of rays, the laser light to converge on the sample surface to scan the sample surface via the deflecting device and that causes, by inserting the collector lens in the path of rays, the laser light to converge on the pupil position of the objective lens as being decentered from the center of the pupil position of the objective lens via the deflecting device, wherein the switching member is composed of a path folding unit arranged on a second plane different from a first plane in which optical axes of other optical elements constituting the laser microscope lie and a prism with two reflecting surfaces that is movable in a direction perpendicular to the first plane, to be in and out of the path of rays on the first plane, and wherein the path folding unit is composed of the collector lens and four reflecting members that are fixedly positioned and at least one prism formed as a plane-parallel plate insertably and removably arranged in a path of rays of the path folding unit on the second plane so as to achieve a variable light convergence position of the collector lens while maintaining a path length of the path folding unit.

* * * * *